United States Patent [19]

Smith

[11] 4,157,155
[45] Jun. 5, 1979

[54] SEALING APPARATUS AND METHOD

[76] Inventor: Thomas M. Smith, 114 Villinger Ave., Cinnaminson, N.J. 08077

[21] Appl. No.: 906,229

[22] Filed: May 15, 1978

Related U.S. Application Data

[63] Continuation-in-part of Ser. No. 701,687, Jul. 1, 1976, abandoned, and Ser. No. 775,838, Mar. 9, 1977, and Ser. No. 863,251, Dec. 22, 1977, said Ser. No. 701,687, and said Ser. No. 775,838, is a continuation-in-part of Ser. No 674,409, Apr. 7, 1976, Pat. No. 4,035,132.

[51] Int. Cl.² ............................ B23K 1/12; B23K 3/04
[52] U.S. Cl. ..................................... 228/183; 228/242; 431/328
[58] Field of Search ................. 228/183, 242; 431/328

[56] References Cited

U.S. PATENT DOCUMENTS

| | | | |
|---|---|---|---|
| 2,298,996 | 10/1942 | Woods | 228/183 X |
| 2,389,175 | 11/1945 | Woods | 228/183 X |
| 2,577,124 | 12/1951 | Newcomer | 228/183 X |
| 3,456,331 | 7/1969 | Holden | 228/183 |

Primary Examiner—C. W. Lanham
Assistant Examiner—K. J. Ramsey
Attorney, Agent, or Firm—Connolly and Hutz

[57] ABSTRACT

A set of metal heat exchange tubes is simultaneously brazed into a metal tube sheet more rapidly and with greater uniformity by holding tube-and-sheet assembly under radiant heater with sheet essentially horizontal and carrying brazing metal, and forcing gases from above tubes down into tubes as assembly is heated. Heater can have heating surface enveloping the top and sides of the sheet, or can have flat heating surface, but is preferably a ceramic fiber gas burner. Burner can be divided into two portions using a single ceramic fiber mat and separate combustion mixture supplies, with non-combustible gas fed through one portion when other portion is the only one operating.

8 Claims, 9 Drawing Figures

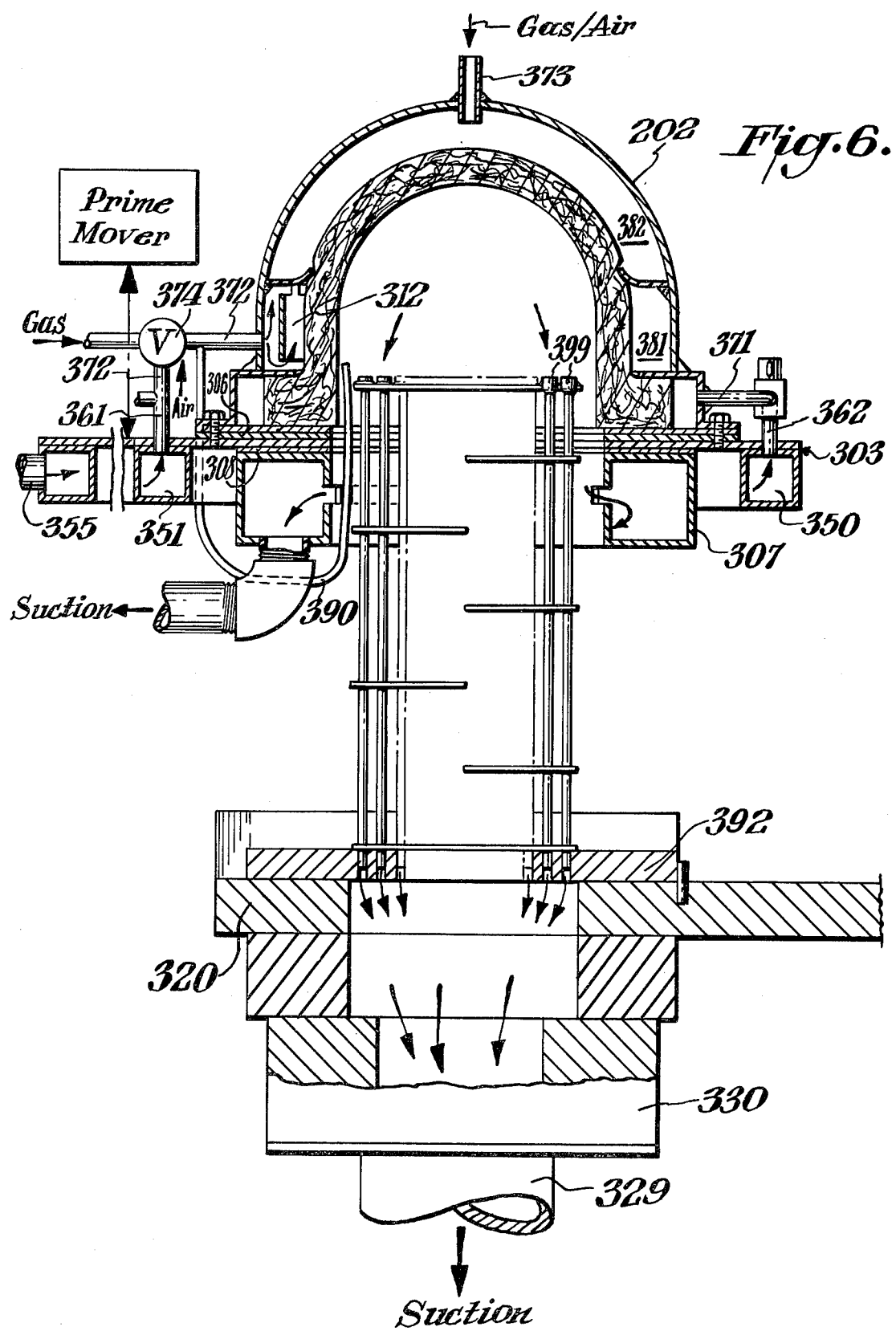

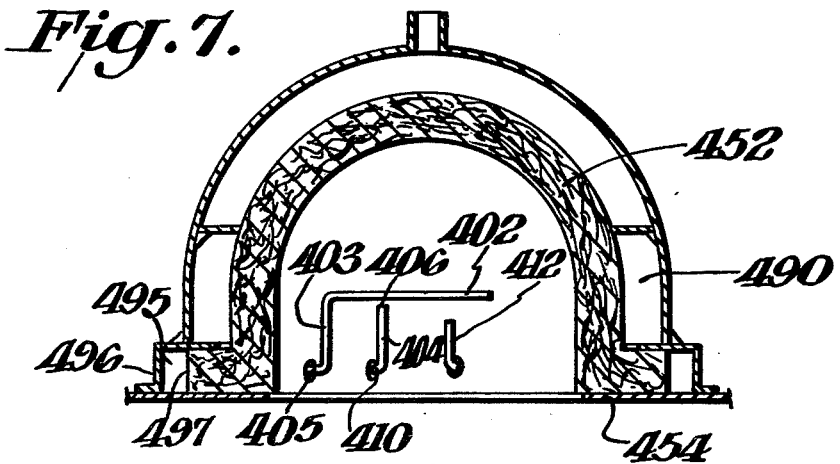

SEALING APPARATUS AND METHOD

This application is a continuation-in-part of applications Ser. No. 701,687 filed July 1, 1976 (subsequently abandoned), Ser. No. 775,838 filed Mar. 9, 1977 and Ser. No. 863,251 filed Dec. 22, 1977. Applications Ser. No. 701,687 and Ser. No. 775,838 are in turn continuations-in-part of application Ser. No. 674,409 filed Apr. 7, 1976, now U.S. Pat. No. 4,035,132 granted July 12, 1977.

The present invention relates to the sealing of heat exchange tubes to a tube sheet, and to apparatus suitable for use in that connection.

Among the objects of the present invention is the provision of novel methods and apparatus for effecting such sealing.

The foregoing as well as additional objects of the present invention will be more fully understood from the following description of several of its exemplifications, reference being made to the accompanying drawings wherein:

FIG. 6 is a sectional view of the machine of FIG. 5 showing details of its infra-red generating and utilizing construction;

FIG. 7 is a vertical sectional view of a hat-shaped burner showing a modified ignition and control arrangement;

FIG. 8 is a detail plan view partly broken away, of an ignition and control arrangement incorporated in a burner with a flat matrix; and FIG. 9 is a sectional view of the arrangement of FIG. 8, taken along line 9—9.

Figure 1:
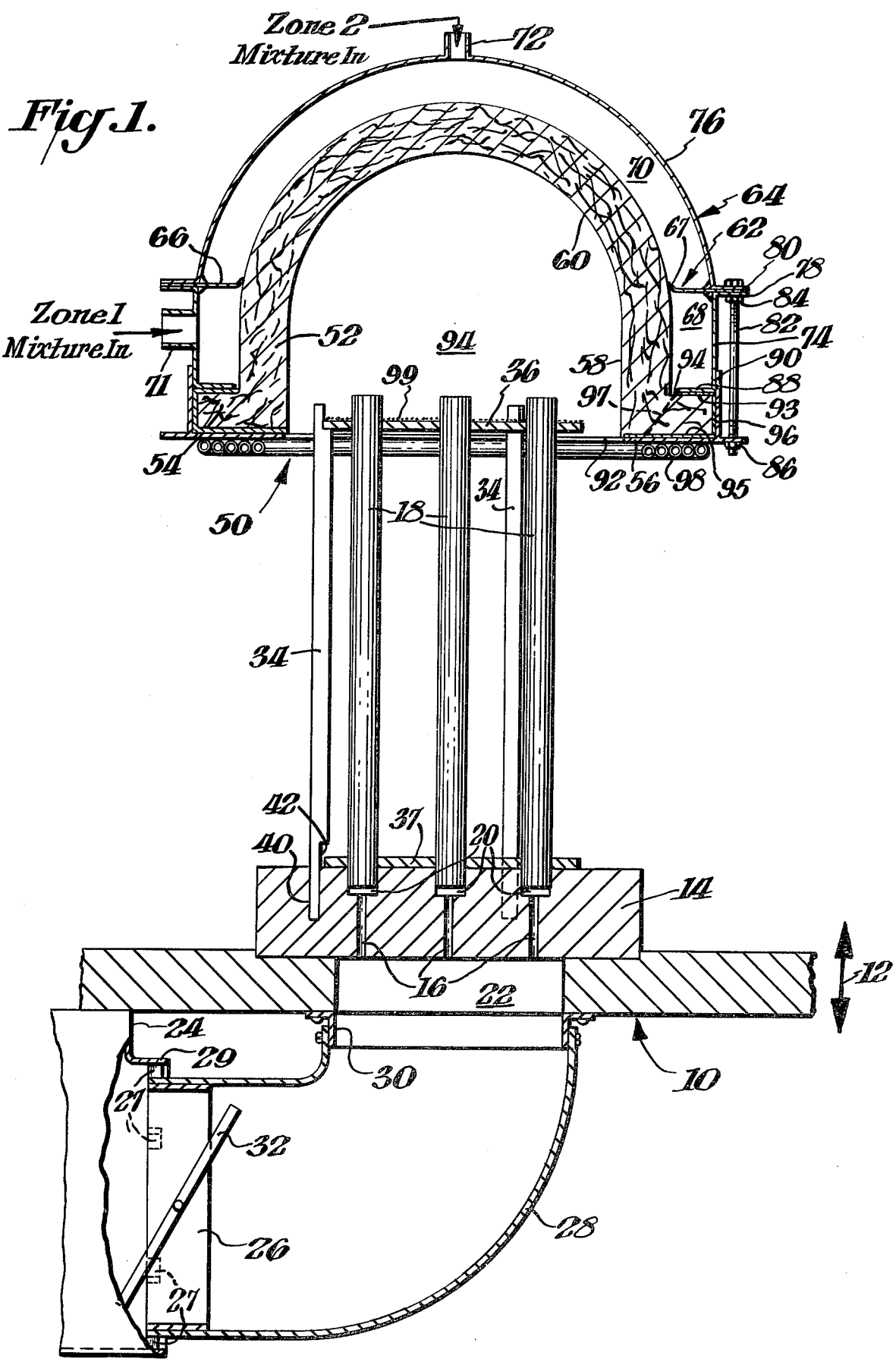
FIG. 1 is a somewhat diagrammatic vertical sectional view of one set-up for practicing the present invention.

Industry has need for relatively small all-metal heat exchangers, as for use in cooling oil that lubricates an internal combustion engine. Such a heat exchanger can have as many as several hundred heat exchange tubes connected between two sheets in a leak-proof manner. Leak-proof connections for this purpose are generally made by a fusible metal sealant whose melting takes place at a temperature well above the maximum operating temperature of the heat exchanger. While tin-lead solders can be used as sealants for operating temperatures near the normal boiling point of water when no great mechanical stresses are encountered, brazing alloys including the so-called silver solders are used for higher operating temperatures or higher stresses. Such leakproof brazing of a quantity of relatively small tubes in a tube sheet has been an awkward industrial operation that takes substantial time to assure the heating of all joints to the desired sealing temperature, and generally requires patching to seal leaks resulting from uneven heating during the original sealing.

According to the present invention more rapid and more effective sealing is accomplished by holding an assembly of the heat-exchange tubes each tube having one end in a sheet with the sheet in essentially horizontal position and carrying on its upper surface a quantity of fusible metallic sealant adequate to seal all tubes into the sheet, applying radiant heat downwardly on the sheet to heat it at least to the fusion point of the fusible sealant, and moving gases down from above the tube ends down through the tube ends during the heating to cause the heating to be more uniformly applied to the tubes so that the sealant rapidly seals all tubes to the sheet.

The heat for the fusion is desirably applied by a ceramic fiber burner such as described in the parent applications, the entire contents of which are hereby incorporated in the present application as though fully set forth herein. Those burners generally have a ceramic fiber mat made of the ceramic fibers described in U.S. Pat. No. 3,449,137, with the mat formation as described in U.S. Pat. No. 3,787,194.

The most efficient heating results of the present invention are obtained when the burner that supplies the heat envelopes the top and sides of the sheet in the tube-and-sheet assembly. Such an enveloping burner is desirably divided into sections that can be operated independently to first heat the margin of the sheet in the sheet-and-tube assembly, and then heat the center. A particularly effective burner construction for this purpose uses a single porous ceramic fiber mat in the general shape of a hat with a shallow plenum divided by a wall into two parts, air or other incombustible gas being fed through one part when that part is not being operated while the other part is being operated. The porous margin of the mat can be sealed off as by a narrow stream of air that is passed through the mat near its edge, by a high-temperature-resistant impregnant like aqueous sodium silicate, or by wrapping with a soft material like aluminum foil and the sealed-off margin clamped in place.

Turning now to the drawings, the apparatus of FIG. 1 includes a table 10 movable up and down as indicated by the two-headed arrow 12, and a radiant heater 50 positioned above the table. The table carries on its upper surface a block 14 having a number of vertical passageways 16 corresponding to the number of tubes 18 to be assembled into a heat exchanger, and located in a corresponding pattern. The upper ends of the passageway 16 are enlarged as at 20 to receive and position the lowest portion of each tube. The lower ends of the passageways 16 open at the bottom of block 14 over a suction opening 22 in table 10.

A blower 24 is shown as carried by table 10 and as provided with a suction tube 26 connected as by flexible duct 28 to a mounting ring 30 secured around opening 22. A butterfly valve 32 can be fitted to the suction tube 26 to enable controlling of the suction applied to the bottom of block 14 when the blower 24 is operated. Also the suction tube 26 can be spaced as by webs 27 within a wider intake mouth 29, so that when the blower operates it sucks air in around the suction tube 26 as it sucks through tube 26.

Block 14 also carries a set of supports 34 encircling the tubes 18 and holding a tube sheet 36 in position at or near the tops of tubes 18. Supports 34 can be removably fitted in sockets 40 in block 14, and can have their lower portion cut away as at 42 to allow for the position of another tube sheet 37 on block 14.

Heater 50 has a porous ceramic fiber mat 52 in the general shape of a hat with a horizontal flange 54 by which it is mounted in place behind a face plate 56. The crown section of the hat shape consists of a cylindrical portion 58 a few inches in height and a hemispherical portion 60, a relatively shallow plenum space 62 being provided around the crown by a housing 64 to which the face plate 56 is removably secured.

The plenum space is divided by a partition 66 that extends around the inside of the housing, into a lower generally annular plenum portion 68, and an upper hemispherical shell-like portion 70. Separate inlet nipples 71, 72 are provided on the housing for separately supplying combustion mixture to the separate plenum portions. In the illustrated embodiment the housing 64 is made of a lower cylindrical section 74 and an upper hemispherical section 76. Outwardly projecting flanges 78, 80 on these housing sections where they meet, serve as attachment structure for holding the entire housing together and also holding partition 66 in place. To this end a number of threaded flange bolts 82 project through aligned sets of openings in flanges 78, 80 and in partition 66, and nuts 84 threaded on these bolts secure these members together. The bolts 82 are distributed around the housing and they also project downwardly for enough to provide securing means for the face plate 56 which is also provided with mounting openings aligned with the bolts. An extra set of nuts 86 threaded on the bolts secures the face plate in place.

The burner is constructed by first assembling the housing portions 66, 74, 76, then forcing the pre-formed and prepared mat in the assembly so that it firmly engages the inner lip of partition 66, and then securing the face plate. The partition lip can be turned up as shown at 67, to make a better seal against the mat.

An internally directed flange 88 at the lower end of lower housing section 74 is used to provide a ledge against which the mat flange 54 is held to help seal the edges of the mat against gas leakage. A cylindrical flange 90 is also shown as integral with and projecting up from the top of the face plate, to encircle the mat edges and closely fit around the lower edge of the housing. This helps hold the mat in position and strengthens the face plate. A central hole 92 in the face plate slightly larger than the mouth of the mat 52 permits the top of the tube-and-sheet assembly to be brought into the burner a short distance above the mouth of the mat and also permits the movement of gases out from the work space 94 enveloped by the mat.

The burner is operated with gaseous combustion mixtures, and it is accordingly helpful to seal all locations through which such a mixture can leak out from the burner. Thus the joint between the housing members 64 and 66 as well as between 66 and 74, can be sealed by gasketing or as shown by painting these junctures with a liquid silicone that cures to a solid sealant. Also the margin of the mat flange 54 is shown as encircled by a sheet of aluminum foil 93 carefully folded around the upper, lower and edge faces 94, 95, 96, and sealed against ledge 88 by a sealant such as a self-curing liquid silicone rubber.

It is also helpful to fill the pores of the mat in the outer section of mat flange 54, as by impregnating that section with aqueous sodium silicate that dries in place or liquid silicone rubber that cures in place, as indicated at 97. Another desirable feature is to water cool the outer margin of the face plate, as by brazing water-cooling coils 98 to its lower surface.

In operation the apparatus of FIG. 1 has its table first fitted with the tubes and tube sheets as shown, although there will usually be many more tubes than indicated in the figure, and a quantity of powdered or granular fusible sealing material 99 spread over the upper sheet 36.

The blower 24 is started and the table is raised to the position illustrated so that the upper sheet 36 has its upper surface and side edges enveloped by the burner. Both sections of the burner are then started, followed by opening of suction control valve 32. When the tubes 18 are copper or brass with a wall thickness of about 30 mils, and the upper sheet 36 is of copper, brass or steel with a width of 8 inches and a wall thickness of about 90 mils, and the burner is burning about 30,000 B.T.U. per hour of combustion mixture, a copper-phosphorus or silver-copper-flux sealing braze will in less than about ½ minute be melted and will flow into and seal each tube to the sheet with a text-book seal, regardless of how many tubes there are. Care should be used when applying the fusible sealing material so that excess material does not plug any tube, inasmuch as this would impede the flow of hot gas through the tube resulting in uneven heating.

To avoid overheating, the burner is shut off as soon as the sealing is completed, although the suction can be continued. Prolonging the suction helps cool down the heated assembly and thus further reduces surface oxidation.

If the suction is not used during the heating the heatup of the sheet is not uniform and much more heat-up time is needed before all parts of the sheet are hot enough to melt the sealing material. By that time the outer portions of the sheet are greatly overheated and if not badly damaged can also become sealed to the supports 34 even if the upper ends of the supports are about ⅜ inch thick steel. On the other hand when the burnt combustion gases are sucked down the tubes at a speed as low as about ½ linear foot per second the heat-up becomes so uniform that the sealing of all the tubes is completed long before the upper ends of supports 34 get hot enough to seal. The portions of the sheet 36 touched by the supports 34 will not heat-up very rapidly, with or without the foregoing gas flow, and this will also tend to make the immediately adjacent portions of the sheet a little slow in heating-up so that for best results it is desirable to have the tubes at least about ⅜ of an inch away from all supports. Those supports can also carry special fittings that make their upper ends more massive for even greater thermal inertia, but the ⅜ inch spacing of the tubes from their tops is still enough. Where there is considerable hardware around the margin of the tube sheet it is helpful to start the lower section 58 of the burner 50 before starting the upper section 60, and to start the upper section a few seconds later after the margin of the sheet has absorbed sufficient heat to be well on its way to temperature. To guard against misoperation air without fuel is blow through the upper portion of the mat while the lower portion is burning and the upper portion is not burning. This practically equalizes the pressures on both sides of partition 66 and thus minimizes flow of combustible mixture to undesired locations where it can be unintentionally ignited.

Filling the mat pores at 97 also avoids localized collection of stagnant combustible mixture.

There is no practical upper limit to the speed with which the hot combustion gases are forced down the tubes. There is for example no need for gas-tight connections between the tubes and passageways 16; indeed as shown by the open gap between suction tube 26 and suction intake 27, it is helpful to have air leaks that draw unheated air into the blower along with the hot combustion gases and thus help guard against overheating of the blower.

The tubes 18 are themselves not very wide, generally less than a half inch in inside diameter, so that it is difficult to effect extremely rapid gas movement through them. Speeds of 20 feet per second are suitable.

The seals made in a fraction of a minute pursuant to the present invention are found to have far fewer flaws than seals made in two-and-a-half minutes without the use of the gas movement down the tubes. Moreover because of the much greater uniformity of the heat-up according to the present invention the melting and flow of the sealing material is also more uniform so that less sealing material is needed. As compared to the quantities of sealing material ordinarily used in the prior art, about half as much is needed for use with the present invention. Thus for joints in which the tubes have an outside diameter about 2 mils smaller than the diameters of the holes in the sheet, only about one gram of sealing material is needed for every square inch of sheet surface in accordance with the present invention.

Figure 2:
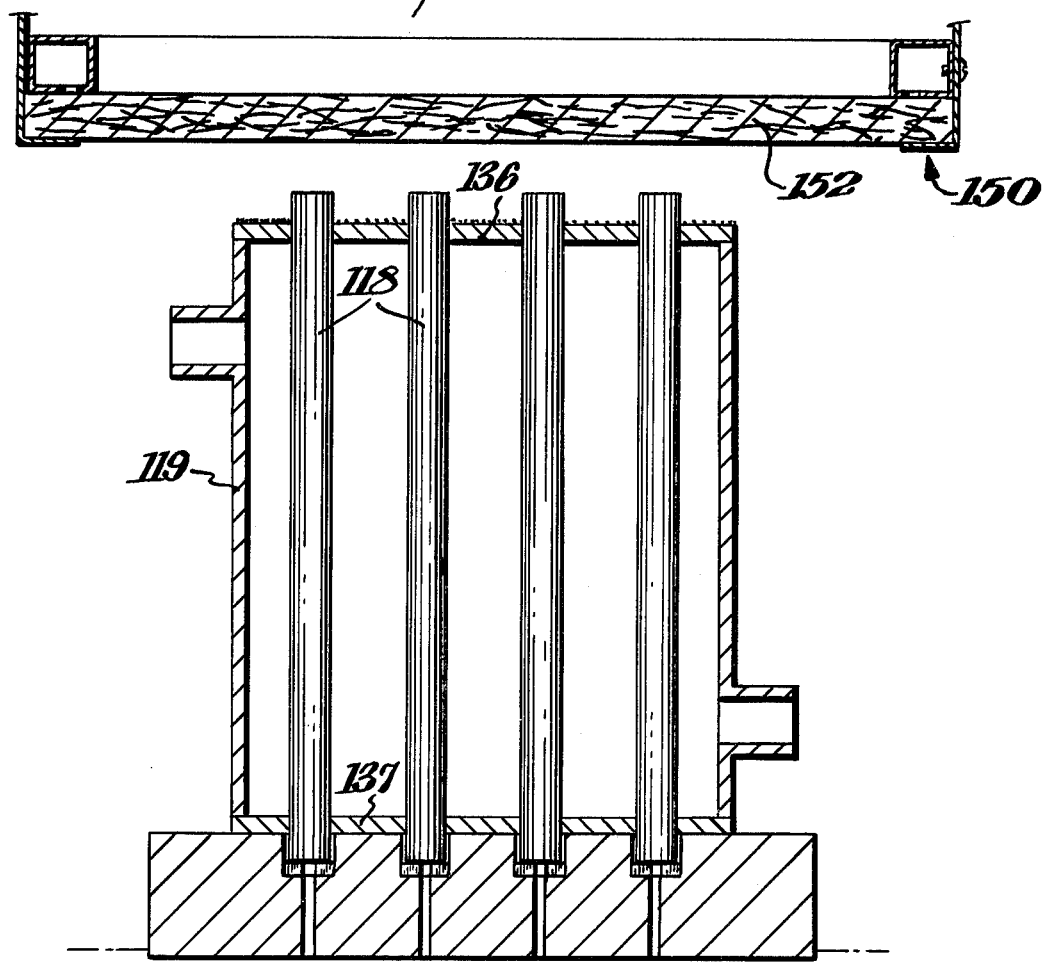
FIG. 2 is a similar view of a modified set-up pursuant to the present invention.

FIG. 2 shows a modified sealing arrangement of the present invention. Here a burner 150 having a generally flat burner face 152 is used. This extends the heat-up time somewhat as compared to the construction of FIG. 1, and as a result wide assemblies may take as much as 50% more time to seal. However the sealing time is still far less than obtainable from the prior art.

Figure 5:
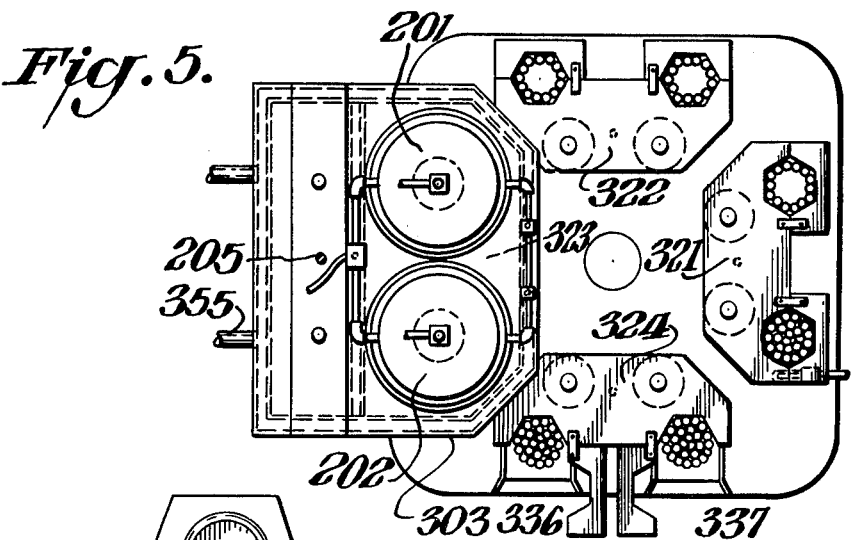
FIG. 5 is a plan view of the machine of FIG. 4.

The burner 150 of FIG. 2 can be constructed in the matter described in FIG. 5 of parent application Ser. No. 674,409 where the ceramic fiber mat has its margin merely fitted to a frame having an inert gas blow-through arrangement in which the inert gas thus blown through the margins of the mat acts to seal those margins against combustible mixture leakage. No other margin sealing is then needed.

In the FIG. 2 arrangement tubes 118 are sealed to a sheet 136 while the tube-and-sheet assembly is held within a tubular casing 119 which eventually forms the shell of the heat exchanger. In about a half minute such an assembly can be sealed following which the assembly is inverted so that the opposite end is similarly sealed, and the sheets are then later brazed or welded to the shell margins. Where the shell is steel of low wall thickness it can be sealed against the sheets at the same time as the tubes are sealed, preferably using the enveloping burner arrangement of FIG. 1.

While suction provides a convenient technique for moving the hot burnt combustion gases through the tubes, they can also be forced through from above. Thus the burner of FIG. 2 can have its frame provided with a depending cylindrical extension that encircles the shell 119 and has an asbestos lining pad that closely engages the shell. Operating the burner in such an arrangement causes the hot burnt combustion gases to be discharged downwardly through tubes 118 since they have essentially no other way to escape.

For the purposes of the present invention, brazing is considered a sealing operation in which metal having a melting point at least as high as about 450° F. and generally a copper alloy such as an alloy of 45% silver with 55% copper by weight, is the sealant. A braze alloy having a wide temperature range of plasticity such as an alloy having 35% silver, 26% copper, 21% zinc and 18% cadmium, is preferred. Brazing temperatures can go as high as 1300° F. or even higher. Flux based on boric acid, borax or fluoborate are generally used with the brazing metal to protect it and the parts being joined against excessive oxidation and to promote wetting of the parts by the melted braze. Some brazing metals such as copper-phosphorus alloys can be used without a separate flux. When the gap between tubes 18 and the holes of tube sheet 36 is not held to close tolerance, it is advantageous to braze with a mixture having about 10 to 25%, preferably 15 to 20% flux by weight, flux having a high density and a medium viscosity in its liquidus state. Also it is preferred to have about 5 to about 10% fluoride in the flux. Such a combination permits the flux to clean both sides of sheet 36 adjacent the tubes and provides good brazing to both those sides even when the gap is 5 mils or more.

It is helpful to have the flux pre-mixed with the brazing metal, as by providing the metal in powder form and coating the flux on the individual powder particles.

The heater in the sealing apparatus of the present invention is preferably operated only for short intervals while the sealing metal is being melted and flows into place. Thus the heater can be completely shut off between sealing sequences, and ceramic fiber burners are particularly helpful in such intermittent operations inasmuch as they heat up and cool down in only a few seconds. For such intermittent operations it is also helpful to have the burner plenum of relatively small volume, preferably not over about 1½ inches deep. In this way combustion gas can be intermittently fed to the plenum and rapidly reach the exit surface of the fiber mat where it is burned, so that the timing of the burner action is simplified.

An igniter such as a pilot assembly or an electric spark ignitor can be fitted near the margin of the burner to assure that it lights up each time a combustion gas feed is initiated. A settable automatic switching sequencer can be used to time the gas feed to the different burner portions as well as the suction blower.

The burner can be turned down rather than completely off, between sealing stages, so that it does not need separate ignition after it is once started up. Where the burner has two or more firing compartments, as in FIG. 1, one compartment can be turned down between sealing stages and the other compartments turned completely off. The burning of the matrix surface of the turned down compartment will then ignite the burning at the other compartments when they are turned on.

Instead of, or in addition to, moving the table up and down to bring the work to the burner, the burner can be moved toward and away from the table. In the construction of FIG. 2 no vertical movement is needed by the table or the burner.

An auxiliary heater can also be provided around and above the lower tube sheet 37 in the construction of FIG. 1, and operated to seal the lower tube ends into that sheet while the tube-and-sheet assembly is held in the illustrated position. Thus a layer of sealing mixture can be applied to the upper surface of the lower sheet and the auxiliary heater started even before the burner 50 is lit inasmuch as the heat-up of the lower sheet takes longer than that of the upper sheet.

Where the margin or a ceramic fiber mat has its pores well sealed, as by the silicone or sodium silicate or other alkali metal silicate impregnant, the mat margin can be clamped in place without wrapping the aluminum foil 93 around those edges. The aluminum foil or other gasketing can still be inserted between the mat margin and the plenum margin, or the silicone or alkali metal silicate can also be used to seal the mat edge to the plenum.

Figure 3:
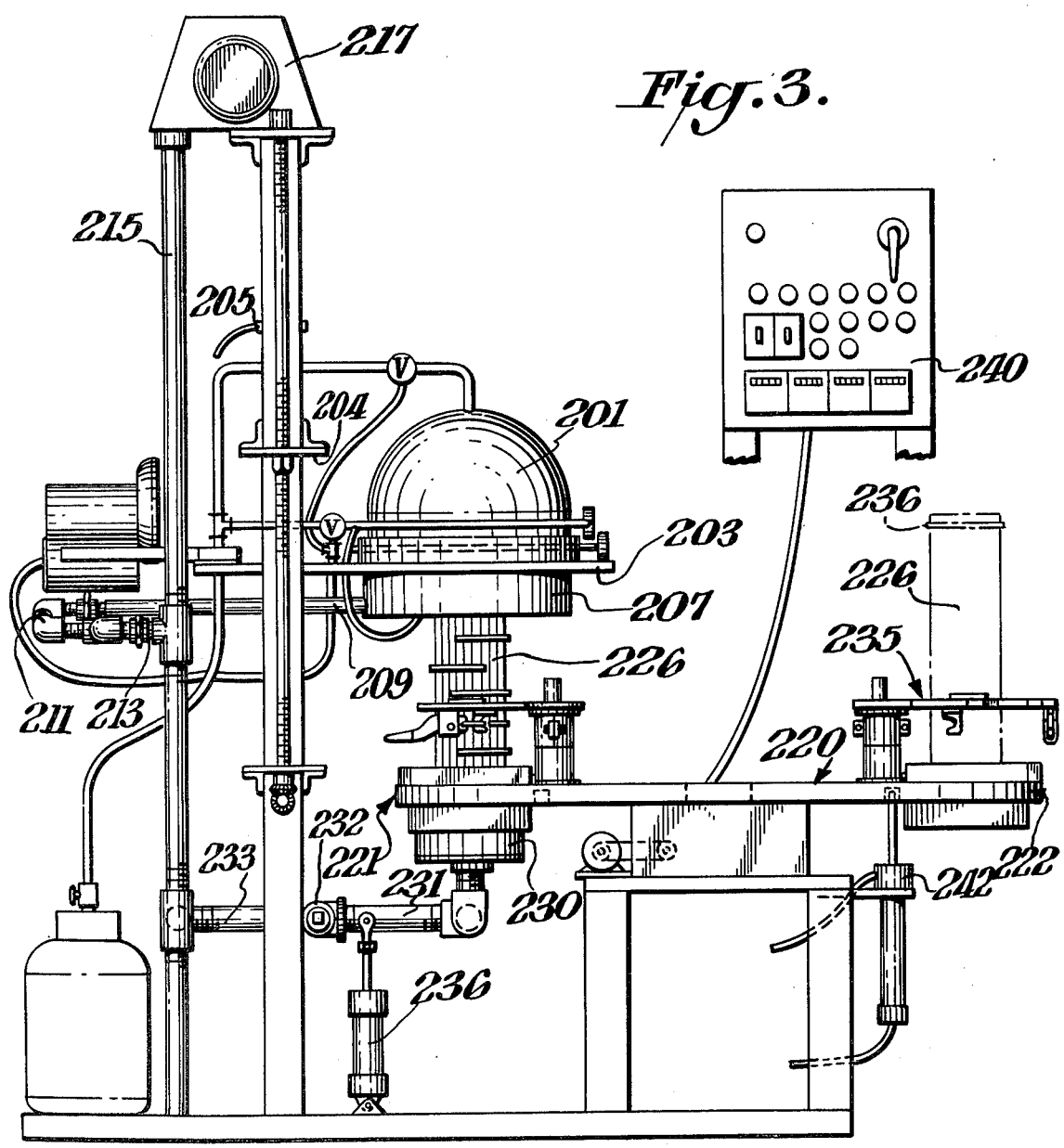
FIG. 3 is a side view of a different form of infra-red generating apparatus according to the invention, showing it as part of a brazing machine.

FIG. 3 shows a modification of the rapid heating device. The apparatus of FIG. 3 has a dome-shaped burner in a head 201 carried by a plate 203 that can be lifted and lowered with respect to an adjustable support 204 by an automatic arrangement, such as an electrically controlled hydraulic cylinder 205. Below the plate and surrounding the open bottom of the burner is a suction duct 207 that has its central wall perforated to draw the off gaseous combustion products generated by the burner. Duct 207 is connected through suitable piping 209, 211, 213 to a suction bus 215 which in turn is connected to the suction intake of a motor-driven centrifugal blower 217.

A rotating table 220 is positioned with one portion of it 221 below burner head 201 and defining a station at which a work-piece, in this case a tube-and-sheet heat exchange assembly 226, is held with its upper sheet 236 just under the burner head as described in Ser. No. 701,687.

FIG. 3 shows an alternate method of supporting the tube-and-sheet assemblies in proper position. The end portions of three or four tubes, equally spaced, around the outer perimeter of the tube bundle are staked or expanded to provide support for the tube sheets. The staking or expanding can be performed after the tube sheets are fitted to the tube bundles, and is easily and rapidly effected as by simultaneously driving 3 or 4 mandrels ¼ to ½ inch into corresponding tubes on each end of the bundle with opposing hydraulic cylinders. Each staking tool desirably has two or three rounded laterally-projecting ribs which expand each treated tube to cause mechanical interference with the edge of the sheet hole. With the tube sheets thus locked in place, the supports 34 of FIG. 1 are not needed and can be replaced with circumferential clamps such as 235 shown in FIG. 3. Such supports can be entirely eliminated particularly where the tubes 18 are sufficiently short or the bundles sufficiently uniform that they can be relied on to keep the upper sheet 236 in proper position.

A suitable expansion tool is conviently made by grinding a bulbous nose on a length of drill rod, then grinding three generally tangential flats equally spaced around the major diameter of the bulb. Flats about 20 to 30 thousandths of an inch deep easily allow about 8 mils expansion.

Expanding all the tube ends at each end of the tube bundle is desirable in that it reduces the clearance between the exterior of the tubes and the edge of the holes in the tube sheets, but even expanding a few tubes helps lock the tube sheet in place against the expanded tube ends. Instead of staking, the tube end can be beaded as shown in U.S. Pat. Nos. 2,298,996 and 2,389,175, to provide a stop against which the tube sheet rests.

Another portion 222 of the table is out from under the burner head and provides another station where the work-piece can be fitted to the table in accurately located position, as by the clamps 235, so that it will be properly located under the burner head when the table is rotated to bring the work-piece to station 221.

Below station 221, a suction head 230 is held on piping 231, 232, 233 that connects it to suction bus 215, and is arranged to be automatically lifted and lowered as by hydraulic cylinder 236, so that it can controllably apply suction to the lower ends of the tubes in the tube-and-sheet assembly. This application of suction draws some of the hot gaseous combustion products from the burner down through the upper ends of the tubes to effect more uniform and more rapid heat-up of the entire upper end of the assembly.

The various suction pipes 211, 213, 231, 232, 233 are of fairly large diameter, such as two inches, to adequately apply the suction. One very inexpensive type of piping to use for this purpose is standard cast iron pipe with lengths of it threadedly interconnected, using standard connection fittings such as elbows and tees. To permit the up and down movement of the burner head 201 as well as the suction head 230, some of the threaded pipe joints can be left a little loose, even though such looseness permits leakage of air into the suction pipe. Thus a loose fit of pipes 209, 213 with the elbows that connect them to pipe 211 permits vertical suction head travel to lift and lower pipe 209 with respect to pipe 213, without significantly affecting the application of suction to duct 207. Similarly a loose connection of pipe 232 with the tee that connects it to pipe 231 permits the suction head movement. In each case the loosely threaded joints are those in which the threading axis is the axis around which rotation takes place.

Instead of merely having a simple threaded connection loosely engaged, the looseness can be provided by fitting a standard three-piece union connector to the pipe. Such a standard union has two separate pipe-engaged parts that can be coupled together by the third part to make a tapered or conical joint. For the purpose of the present invention the two pipe-engaging parts are each tightly threaded or otherwise tightly secured to the respective pipe lengths to be connected, but the third or coupling part of the union does not tightly couple the first two parts together. Instead the coupling part, which is generally threadedly engaged, is left incompletely threaded. It can be secured in the incompletely threaded condition, as by a set screw threaded through the coupling part and jammed against the pipe-engaging part to which it is incompletely threaded. This keeps the coupling thread from rotating so that rotation is provided solely between unthreaded surfaces of the parts. These surfaces are smooth and not exposed to the outside, so that they are not likely to become jammed by dust or dirt, like exposed loose thread joints.

The apparatus of FIG. 3 is operated as by an automatic pre-settable electric controller 240, to rotate table 220 indexing it accurately into position while the burner and suction heads 201, 230 are held out of the way, then lowering the burner head, and igniting the burner, followed by raising the suction head, all timed to get the work-piece properly heated and sealed. The burner can then be extinguished, the burner head raised out of the way, the suction head lowered out of the way, and the table indexed around to carry out the sealed work-piece to station 222 where it is removed and replaced by a fresh work-piece. While such removal and replacement are being effected, a work-piece previously mounted at that station but now at the sealing station is automatically subjected to the sealing sequence. Thus at each indexing of the table one sealing operation is completed.

The suction pipe 209 is spaced from the top of the work-piece by at least about ½ inch, and its sucking effect on the gaseous combustion products does not interfere with the action of the suction head 230 which engages fairly tightly with the bottom ends of the tubes and draws hot combustion products down into those tubes.

The burner in head 201 is preferably equipped with an air-seal margin the edges of which can be compressed as in Ser. No. 775,838, or can be uncompressed. Two plenum compartments are also desirable but for small work-pieces such compartmentation is not needed. The plate carrying the burner head can also carry a blower that provides the air for mixing with gas to make the combustion mixture. No flexing connection is accordingly needed for the blower air. The gas for combustion can be supplied through a flexible connection, but since the quantity of gas used can be only about one-tenth as much as the air used, the gas line can be of very small diameter, such as ⅛ inch or less. Flexible tubing for such thin lines are no problem.

Combustion mixture supplied to the burner at a rate such as 75,000 to 100,000 BTU per hour can complete a sealing heat-up in thirty seconds or less, even when the work-piece being sealed is a collection of fifty tubes each having a 20 mil wall thickness and an internal diameter of ¼ inch. In practice the sealing operation can take somewhat ever 30 seconds. The sealed tube-and-sheet assembly needs several minutes of cooling before it is handled, so that in many cases sealing times close to a minute are available between indexing steps of the table. A fan or blower can be positioned at station 222 to force cool the freshly brazed assemblies. This cooling arrangement can be positioned under the table to blow cooling air through the tubes, or above the table, or both.

The indexing positions of the table can be accurately aligned as by a locating pin 242 hydraulically or pneumatically raised to engage a locating socket in the lower surface of the table. The table rotation is preferably cam operated with its rotational speed varied so as to be quite low as it nears an indexing position, and substantially higher during most of its travel between indexing positions. A very desirable time for effecting an indexing step is about five seconds or somewhat less.

The apparatus of FIG. 1, 2 or 3 can be used for soldering with silver solder and even with soft solder, instead of brazing. For soft soldering the heat requirement is relatively low and the burner of FIG. 2 is more than adequate. Articles having extensive width, such as solar panels, can be very readily soft soldered by heating them with a row of burners 150, and in such arrangement the burners are preferably placed under the panel so that they are operated with their matrix facing upwardly. In this arrangement the naturally upward flow of combustion gases makes it unnecessary to have the special flow direction structure of FIG. 1.

Lengths of pipe can also be heated by flat-matrix burners, deployed in rows around the entire outer surface of pipes so long as 20 feet, for example. To speed such heating the hot combustion gases can be collected from around the burners and blown through the interior of the pipe, as by surrounding the burner assembly, or the spaces between adjacent burners, with conduit walls that direct the emitted gases to one end of the pipe. The volume of space within large-diameter pipes can be reduced by inserting a mandrel into the pipe interior, so that the hot gases are confined adjacent the internal surface of the pipe. Swirling baffles can also be mounted around the mandrel to help make the gases moving within the pipe more uniform in temperature. It may be desirable to apply thermal insulation over the outer surface of the mandrel to reduce heat losses. The combustion gases exiting from the interior of the pipe being heated, still have sufficient heat for preheating the next pipe to be heated, and for this purpose the pipe to be preheated is coupled to the pipe being heated.

Figure 4:
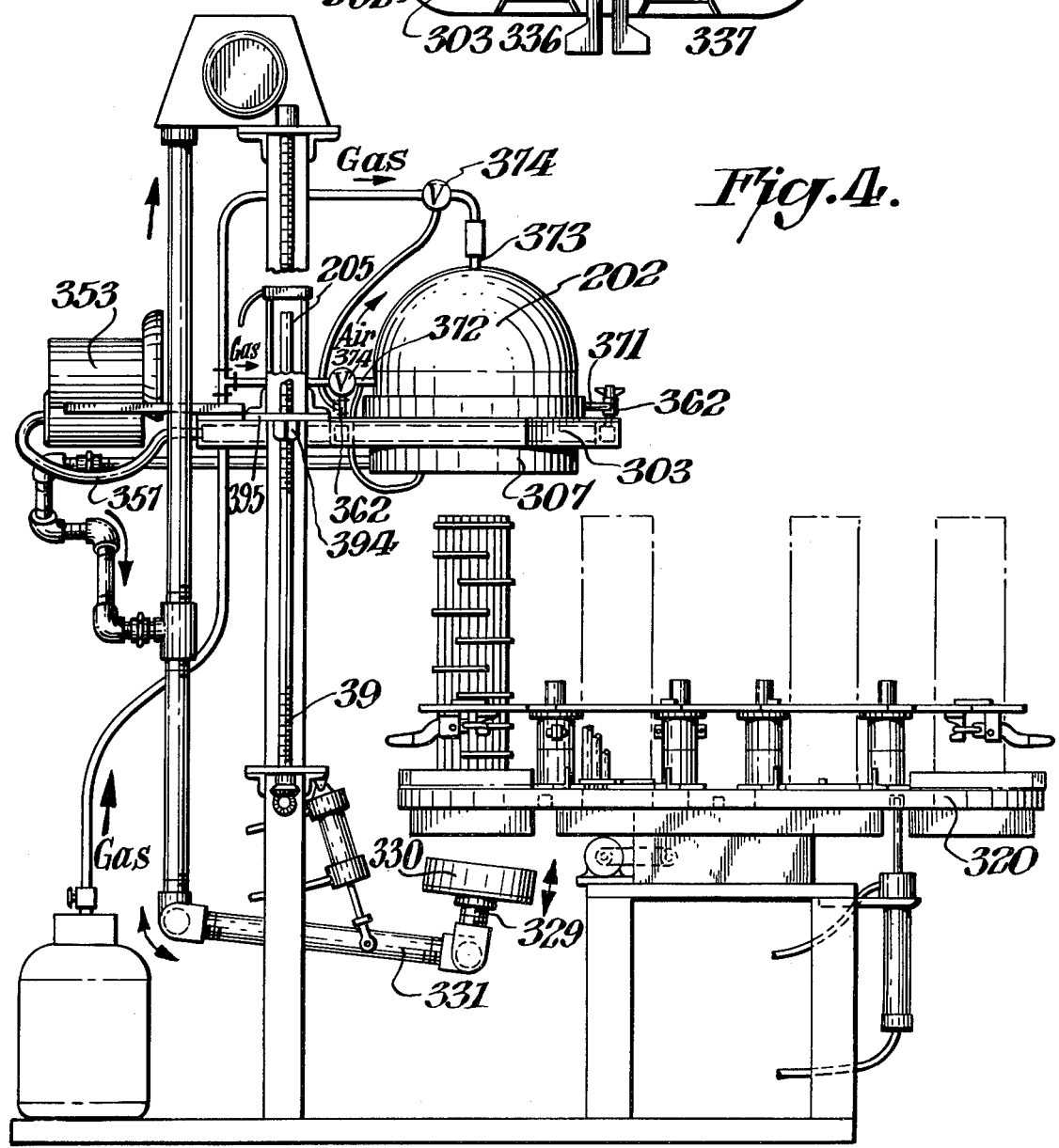
FIG. 4 is a similar view of a modified brazing machine pursuant to the present invention.

The construction of FIGS. 4, 5 and 6 is a modified tube-to-sheet brazing machine have a table 320 with four indexing stations 321, 322, 323, 324 at each of which two tube bundles are arranged to be clamped in place side by side. At station 323 two burners 201, 202 are located and held in a frame 303 in side by side relationship corresponding to that of the tube bundles. The frame accordingly carries both burners down into heating position over the two tube bundles at station 323. Staking as shown at 399 holds the tube sheets in place.

Frame 303 is illustrated as having a periphery made of square tubing 350 traversed by a cross tube 351 interconnected with the peripheral tubing. This frame tubing is arranged to conduct air from a blower 353 to both burners, one or more intake nipples 355 being connected by hose 357 to the air outlet of the blower, and discharge nipples 361, 362 being provided close to the burners for connection to the various burner inlets. One inlet 371 receives air only, for use as a marginal air seal pursuant to the parent applications. Two other burner inlets 372, 373 are connected to mixing valves 374 that can be separately controlled to independently deliver air or air-gas mixtures to two separate plenums 381, 382 of each burner.

A suction conduit 331 is branched to provide two separate suction heads 330, one for the lower end of each tube bundle at station 323. The use of a single suction head that spans across both tube bundles and has only one suction connection is not desirable inasmuch as such an arrangement tends to cause the suction application to be too non-uniform; a little high in locations close to the suction connection and a little low in locations remote from that connection. The preferred suction connection is a conduit 329 axially aligned with the tube bundle through which it sucks gas downwardly.

Strips of thermal insulation 306, 308 can be inserted between frame 303 and the burner bottom, as well as between the frame and the suction ring 307, to help keep the frame from excessive heating. A small baffle 312 can also be secured to the partition between burner plenums, to help direct the combustion mixture flow in plenum 381. A similar baffle may be included in FIG. 1 to provide a more uniform flow of gas to the surface of the porous mat. A baffle in plenum 382 (or 70 in FIG. 1) is not required because of plenum symmetry. Even if the gas flow into the lower plenum results in asymmetrical heating, such may be advantageous to heat asymmetrically located metal masses on the tube-and-sheet assemblies.

The apparatus of FIGS. 5 and 6 with its greater number of table stations has its table rotate from one station to the next in less time than that of FIG. 3, and has twice as many tube bundles brazed at each station. The combined result is a sharp increase in output. To operate the two-burner apparatus at its highest efficiency both burners are adjusted to supply about the same heat output, so that the sealing time is not lengthened unnecessarily by a lower heat output from one burner. If desired the two burners can be timed so that one burns for a somewhat different time than the other, to help compensate for heat output differences or the like. Thus one tube bundle can be previously unheated, and its companion bundle can be hot from a brazing that has just been completed on its opposite end or elsehwere, and accordingly needs slightly less heat-up.

A pilot gas line 390 can be used to supply a small pilot flame that ignites the burner each time either plenum is supplied with combustion mixture. Less desirably both compartments of the burners can be turned down, rather than completely off, between sealing steps and the pilot eliminated, with ignition provided only when the apparatus is placed in operation.

The table holding the tube bundles can be provided with replaceable and interchangeable inserts 392 that are specially shaped, drilled and positioned to receive the lower ends of different types of tube bundles. For bundles of different heights, the frame 303 is arranged to be set at different levels as by the rotatable long threaded shafts 393 threadedly engaged in nuts 394 welded to a cross bracket 395 against which frame 302 is held by its hydraulic operator or other prime mover.

The burners described above are desirably constructed with their metal portions made of sheet metal that can be as thin as 30 to 50 thousandths of an inch. The metal housing for the hat-shaped burners can be drawn or spun, preferably of aluminum, and the metal housing for the flat burners are conveniently of bent and welded-together stainless steel members.

The matrixes for the hat-shaped burners can be formed in one piece or they can be pieced together. Thus the brim of the hat can be cut out from a flat matrix sheet and joined to the crown-shaped matrix portion. The crown-shaped portion can be formed by interfelting the ceramic fibers from a suspension in air or water, in a porous mold made of wire screening shaped to provide the desired crown. The margin of the crown can then be butt-joined against the upper face of the brim by a thin layer of self-hardening liquid silicone rubber, or other resinous sealants, as explained in application Ser. No. 863,251. Although the layer of such sealant is extremely thin, it makes an effective block against movement of gas through it. The marginal air-seal flow for the hat-shaped burner can accordingly be through the entire height of the brim of the hat up to the sealant layer, so that combustion mixture is more effectively kept out of the air-seal zone.

The hat-shaped burner can be replaced by a combination of two burners; a cylindrical one that partially envelopes the top of a tube-and-sheet bundle, and a flat one such as in FIG. 2 above the cylindrical burner and facing downwardly. The flat burner preferably has its matrix fired to give a circularly defined incandescent zone, so that it radiates downwardly only through the interior of the cylindrical burner.

Instead of using a pilot flame to ignite the combustion mixture emerging from the inner face of the burner, electric ignition can be used. FIG. 7 illustrates a particularly desirable electric ignition arrangement.

In FIG. 7 a ground electrode rod 402 arcuately shaped to fit snugly close to the inner surface of matrix 454 has one end 403 offset and bent outwardly at 405 to project laterally through the brim 497 and is secured in the outer wall 496 of the air-seal plenum 495. An ignition electrode 404 is shown as a rod positioned so that its end 406 is located about $\frac{1}{8}$ inch from an intermediate portion of the ground electrode. Electrode 404 is shown as held in place by an outwardly bent extension 410 that also passes laterally through the matrix brim and is secured at the outer wall 496. The spark gap between electrodes 402, 404 is located adjacent a portion of the matrix through which combustion mixture emerges, so that the generation of sparks in the gap ignites the mixture. A $\frac{1}{4}$ inch spacing of the gap from the matrix surface is suitable.

Electrodes 402, 404 can be rods only about $\frac{1}{8}$ inch in diameter so that they do not significantly interfere with the energy radiation from the matrix. These electrodes can also be made of stainless steel, or Inconel, or other high-temperature-resistant metal, to better withstand the temperatures to which they are subjected when the matrix is generating its maximum energy.

Where it is desired to have the additional safety of an automatic gas shut-down in the event the combustion mixture emerges without burning, a sensing rod 412 similar to electrode 404 can also be mounted adjacent the inner surface of the matrix so that this rod reaches a location at which combustion takes place. An electric potential applied between sensing rod 412 and ground rod 402 will cause current to flow through ions generated by the combustion, and such current will not flow when the combustion terminates or fails to start. Such current change can then operate a relay that shuts down the gas supply to the combustion mixture, or shuts down the flow of the entire combustion mixture.

The electric ignition can be used to directly ignite the combustion mixture of zone 490 of the burner, or if desired it can ignite the combustion mixture of a small pilot area of the matrix. The latter arrangement is more suited for burners having large plenums, as for example elongated burners with flat matrixes.

FIGS. 8 and 9 illustrate the last-mentioned construction. In these figures a burner 500 such as is shown in Ser. No. 775,838 has a flat matrix 552 clamped by a hold-down frame 520 against the open face of a burner body 522 assembled from a combustion mixture plenum box 524 and an encircling air plenum channel 526. A slot 528 is provided between channel 526 and box 524 to permit a stream of air to flow through the matrix periphery.

Ground rod 502 is here shown as generally semi-circular having its ends secured under the heads of bolts 516 that clamp the matrix in place. Such bolts are generally provided as an equally spaced series so that the ground electrode can be dimensioned to be received between any adjacent pair of these bolts.

Ignition electrode 504 is shown as held in place by an outwardly bent end 510 received in tubular ceramic insulator 513 fitted through suitable openings in the burner body as well as through the matrix edge. A similar mounting can hold sensing rod 512 within the confines of the ground electrode 502, and can hold all three rods 402, 406 and 412 of FIG. 7. An internally threaded metal fitting 511 can be welded around an opening in the back of the burner body, to threadedly hold a clamping head 509 that grips the ceramic tube. The space occupied by the ground electrode in FIGS. 7 and 8 is also made into a pilot burner compartment 530 by a partition 532 which can be tack-welded to the floor of the combustion mixture plenum 524 as well as to its wall 514. A sealant such as a self-curing silicone paste 534 can be applied to the joint between partition 532 and the mixture plenum to seal off the sides of compartment 530, and a special nipple 550 connected through the mixture plenum floor for feeding combustion mixture into the compartment.

The arrangement of FIGS. 8 and 9 enables the electrical ignition of the combustion mixture emerging from the matrix over compartment 530, and also enables the checking of combustion there with the sensing rod. When such check shows combustion, the resulting change in electric current can be used to start the flow of combustion mixture into the main plenum so that the entire burner is safely placed in operation.

The construction of FIGS. 8 and 9, as well as the construction of FIG. 7, are particularly desirable for use with burners that have an air-sealed margin. The rod mountings are fitted through that margin and do not have to be sealed where they fit through inasmuch as combustion mixture does not reach the margin. So long as the leakage at these fittings does not excessively load the air supply for the air seal, there is no problem.

For more dependable operation of the construction of FIGS. 8 and 9, provisions may be made for preventing rapid lateral air movement across the face of the matrix inasmuch as this may cause the sensing electrode 512 to become insulated from burning combustion mixture by a layer of such air and thus fail to operate properly. An upstanding baffle secured to the burner adjacent the sensing electrode is generally all that is needed.

The constructions of FIGS. 8 and 9 can be made so that it can be assembled without adjustment of any of the rods. Thus the ceramic tubes 513 can have their internal passages provided with grooves 551 that extend longitudinally along a passage, and the rods can be deformed as by pinching their sides to make projecting ears 559 that snugly fit in the grooves. It is then only necessary to rotate the ceramic tube into suitable orientation and lock it in place in the clamp 509 to complete the mounting and positioning of a rod. The locked tube will not rotate, and the ears 559 will keep the rod from rotating within the tube.

The orientation of the locked ceramic tube is not critical inasmuch as ground rod 502 is semicircular and the rod end 510 is mounted at the center of that semicircle. If desired the rod 504 can be inclined as much as 20 degrees either side of the position illustrated, without changing the effectiveness of the spark gap. Sensing rod 512 likewise needs no critical orientation.

Ceramic tubes 513 need not be of one-piece construction, but can be an assembly of short lengths. In this modification the rod mountings such as 510 can have positioning ears 559 or can have additional positioning ears fitted in grooves in the ceramic tube length that is locked by the clamp 509.

The ground rod need have only about 60 degrees of circular arc to provide more than enough mounting tolerance for the sparking electrode. The remainder of the ground rod can if desired extend from each end of the arc directly to the ground rod end mounts, or can complete a true semicircle, or take any other shape.

The proving electrode 512 should extend at least about one inch inboard of the air seal, and the ground rod should have a length inboard of that seal about four times the length the proving electrode extends inboard of that seal.

In the manufacture of a ceramic fiber matrix there is a tendency, particularly when wet felting the fibers in a suction mold from a filler- or binder-containing slurry, for the finished matrix to show some non-uniformity in porosity over an extended surface. When firing takes place on such a surface, there is a similar non-uniformity in temperature.

Needled bats of ceramic fiber in which no significant amount of filler or binder are incorporated, show less tendency for the above-noted non-uniformity. However such needled bats have very little rigidity and are more awkward to use.

An improved matrix can be made by laminating together a layer of needled bat with a layer of suction-formed filler- or binder-containing bat, as by placing the needled layer in the bottom of a suction mold and suction forming the filler- or binder-containing more rigid layer over it. It is preferred that the overall thickness of the laminated combination be from about $\frac{3}{4}$ inch to about $1\frac{1}{2}$ inches, preferably 1 to $1\frac{1}{4}$ inches. Having the more rigid layer at least about $\frac{3}{8}$ inch thick contributes sufficient rigidity to the laminated combination, particularly for use with narrow burners. For burners in which the matrix is about 10 inches or more in width the more rigid layer is preferably at least $\frac{1}{2}$ inch thick.

The laminated combination is preferably fired so that its needled face becomes incandescent. Used this way the incandescence is appreciably more uniform over that surface. Only about a $\frac{1}{4}$ inch thickness of the needled layer is enough to show a definite improvement in uniformity, and increasing the needled layer thickness beyond $\frac{1}{2}$ inch does not add much.

Obviously many modifications and variations of the present invention are possible in the light of the above teachings. It is therefore to be understood that within the scope of the appended claims the invention may be practiced otherwise than as specifically described.

What is claimed:

1. An apparatus for simultaneously sealing a plurality of metal heat exchange tubes in a metal tube sheet having openings through which one end of each tube projects, said apparatus having support means for holding an assembly of tubes in a sheet with the sheet in essentially horizontal position and carrying on its upper surface a quantity of fusible metallic sealant adequate to seal all the tube ends in the sheet, radiant heating means mounted immediately over the tube-and-sheet assembly as supported by the support means, and oriented to heat essentially only the top of the assembly, to bring the sheet of that assembly to a temperature at least as high as the fusion point of the fusible metallic sealant, and gas moving means connected to at least one of the other means to propel gases from above the tube ends down through the tube ends as the assembly is heated, to effect more uniform heating and sealing of the tubes.

2. The combination of claim 1 in which the radiant heating means envelopes essentially only the top of the tube-and-sheet assembly.

3. The combination of claim 1 in which the radiant heating means is a ceramic fiber burner.

4. A process for simultaneously brazing a plurality of metal heat exchange tubes in a metal tube sheet, which process comprises, holding an assembly of such tubes each having one end in a sheet with the sheet in essentially horizontal position and carrying on its upper surface a quantity or brazing metal adequate to seal all tubes into the sheet, applying radiant heat downwardly on the sheet to heat essentially only the top of the assembly to bring the sheet at least to the fusion point of the brazing metal, and moving gases from above the tube ends down through the tube ends during the heating to cause the heating to be more uniformly applied to the tubes so that the sealant rapidly seals all tubes to the sheet.

5. The combination of claim 4 in which radiant heat is applied from a radiant heater that envelopes essentially only the top of the tube-and-sheet assembly.

6. The combination of claim 4 in which the radiant heat is applied from a ceramic fiber burner.

7. The combination of claim 4 in which the heating to at least the fusion point of the braze is effected in not over about half a minute.

8. The combination of claim 1 in which the radiant heating means has a heat output that brings the sheet to the sealant fusing temperature in no more than about half a minute.

* * * * *

UNITED STATES PATENT AND TRADEMARK OFFICE
CERTIFICATE OF CORRECTION

PATENT NO. : 4,157,155
DATED : June 5, 1979
INVENTOR(S) : Thomas M. Smith

It is certified that error appears in the above–identified patent and that said Letters Patent are hereby corrected as shown below:

Col. 4, line 9, "30,000" should be --130,000--.

Col. 4, line 52, "blow" should be --blown--.

Col. 9, line 49, "so" should be --as--.

Col. 10, line 62, "elsehwere" should be --elsewhere--.

Signed and Sealed this

Sixteenth Day of October 1979

[SEAL]

Attest:

RUTH C. MASON
Attesting Officer

LUTRELLE F. PARKER
Acting Commissioner of Patents and Trademarks